United States Patent
Dorum

(10) Patent No.: US 9,766,081 B2
(45) Date of Patent: Sep. 19, 2017

(54) SYSTEM AND METHOD FOR ROUNDABOUTS FROM PROBE DATA USING VECTOR FIELDS

(71) Applicant: HERE Global B.V., Veldhoven (NL)

(72) Inventor: Ole Henry Dorum, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 14/710,193

(22) Filed: May 12, 2015

(65) Prior Publication Data
US 2016/0335887 A1 Nov. 17, 2016

(51) Int. Cl.
G01C 21/32 (2006.01)
G01C 21/26 (2006.01)
G08G 1/01 (2006.01)

(52) U.S. Cl.
CPC .............. *G01C 21/26* (2013.01); *G01C 21/32* (2013.01); *G08G 1/0112* (2013.01)

(58) Field of Classification Search
None
See application file for complete search history.

(56) References Cited

U.S. PATENT DOCUMENTS

| | | | |
|---|---|---|---|
| 6,732,046 B1 | 5/2004 | Joshi | |
| 8,612,136 B2 | 12/2013 | Levine et al. | |
| 2006/0149780 A1 | 7/2006 | Joshi | |
| 2007/0293985 A1 | 12/2007 | Myeong et al. | |
| 2010/0057336 A1 | 3/2010 | Levine et al. | |
| 2010/0082248 A1* | 4/2010 | Dorum ................... G01C 21/32 701/533 |
| 2010/0082307 A1* | 4/2010 | Dorum ................... G01C 21/30 703/2 |
| 2011/0071801 A1 | 3/2011 | Carrasco et al. | |
| 2011/0224893 A1 | 9/2011 | Scofield et al. | |
| 2012/0306923 A1 | 12/2012 | Boschker et al. | |
| 2014/0278052 A1 | 9/2014 | Slavin et al. | |
| 2015/0193562 A1 | 7/2015 | Chan et al. | |

FOREIGN PATENT DOCUMENTS

| | | |
|---|---|---|
| CN | 102313556 | 4/2014 |
| FR | 2997183 A1 | 4/2014 |
| WO | WO2010105712 | 9/2010 |

(Continued)

OTHER PUBLICATIONS

Ameur Touir et al., Design and Implementation of an Automatic Road Network Map Processing System Using GPS Technology, 2003, King Saud University.

(Continued)

*Primary Examiner* — John R Olszewski
*Assistant Examiner* — James M McPherson
(74) *Attorney, Agent, or Firm* — Lempia Summerfield Katz LLC

(57) ABSTRACT

A computing device may detect roundabouts and other road features from probe data including probe heading information. The computing device may model the probe data as vector points in vector fields and perform vector field fitting on a subset of the probe data vectors to identify circulation in the vector fields. The computing device uses the circulation in the vector fields to detect the location of a roundabout or other road feature.

22 Claims, 11 Drawing Sheets

(56) References Cited

FOREIGN PATENT DOCUMENTS

WO     WO2013160471     10/2013

OTHER PUBLICATIONS

Barrile et al, Automatic Recognition of Road Signsby Hough Transform: Road-GIS, Jan. 20, 2012, Geomatics Labratory.
Bildsegmentierung: Hough-Transformation, Power Point presentation, Accessed Mar. 26, 2015, http://cvpr.uni-muenster.de/teaching/ws12/ComputerVisionMustererkennungWS12/script/CVME-07-Segmentation-Hough.pdf.
Clement Zinoune et al, Detection of Missing Roundabouts in Maps for Driving Assistance Systems, Jun. 19, 2014.
Garcia-Garrido et al, Fast Road Sign Detection Using Hough Transform for Assisted Driving of Road Vehicles, 2005, University of Alcala, Madrid, Spain.
Jorge Marques et al, Fast Estimation of Multiple Vector Fields: Application to Video Surveilance, 2011, Instituto Superior Tecnico, Lisboa, Portugal.
Marcos Lage et al., Vector Field Reconstruction from Sparse Samples with Applications, 2006, Computer Graphics and Image Processing.
Yin Wang et al., CrowdAtlas: Self-Updating Maps for Cloud and Personal Use, Jun. 25-28, 2013, http://web.eecs.umich.edu/~yinw/publication/mobisys13-final.pdf.
European Search Report for related European Application No. 16169388.2 dated Oct. 14, 2016.

\* cited by examiner

US 9,766,081 B2

SYSTEM AND METHOD FOR ROUNDABOUTS FROM PROBE DATA USING VECTOR FIELDS

FIELD

The following disclosure relates to detecting road features, and more particularly to detecting roundabout locations and other road characteristics from probe data.

BACKGROUND

Map data or geographic data is used in computer based systems that provide useful features to users. For example, computer based systems may provide for the identification of routes to destinations or points of interests. A navigation system may determine the optimum route to be taken by the end user to travel from an origin to a destination location from map data stored in a map database. Similarly, the navigation system may query the map data for nearby points of interest or provide other map-related functions.

As new roads are built, other roads are closed, or locations of business are changed, the geographic data becomes out of date. These changes to the physical infrastructure must be detected in order to update the map database. One of the usual changes in the infrastructure of the physical road network represented in the map database is the change of a conventional intersection to a roundabout. These changes are particularly hard to detect because two roadways that simply intersected in straight lines now merge into a common path for a short amount of time. Challenges remain in the automation of the detection of roundabouts from probe data.

Probe data can be used to detect road features and characteristics that can be used to generate and update map databases. Detecting roundabouts and other road features from probe is challenging due to the noisy nature of probe data in both position and heading data. Further, detecting roundabouts and other road features from probe is challenging because probe data is sparse and uneven with respect to probe distribution.

SUMMARY

In one embodiment, a method identifies, using a processor, a potential roundabout location from a plurality of probe data points, wherein each of the plurality of probe data points is represented by a location, a heading vector and a velocity. The method selects, using the processor, a subset of the plurality of probe data points for the potential roundabout location. The method normalizes, using the processor, the vector length of the selected subset of the plurality of probe data points. The method performs, using the processor, a vector fit for the subset of the plurality of probe data points and detects a roundabout location from the vector fit.

In another embodiment, an apparatus includes at least one processor and at least one memory including computer program code for one or more programs. The at least one memory and the computer program code configured to, with the at least one processor, cause the apparatus to identify a potential roundabout location from a plurality of probe data points, wherein each of the plurality of probe data points is represented by a vector comprising a location, a heading angle and a length. The computer program code is configured to cause the apparatus to select a subset of the plurality of probe data points for the potential roundabout location. The computer program code is configured to cause the apparatus to normalize the vector length of the selected subset of the plurality of probe data points and to perform a vector fit for the subset of the plurality of probe data points. The computer program code is configured to cause the apparatus to determine a circular singularity for the vector fit, a direction of flow for the circular singularity, and a best fit radius for the circular singularity.

In another embodiment, computing device is configured to select a potential roundabout location from a plurality of probe data points, wherein each of the plurality of probe data points is represented by a vector comprising a location, a heading angle and a length. The computing device is configured to select a subset of the plurality of probe data points for the potential roundabout location and to perform a vector fit for the subset of the plurality of probe data points. The computing device is configured to determine a circular singularity for the vector fit and to determine a direction of flow for the circular singularity.

BRIEF DESCRIPTION OF THE DRAWINGS

Exemplary embodiments of the present invention are described herein with reference to the following drawings.

DETAILED DESCRIPTION

The following embodiments describe systems and methods for automatically detecting roundabouts and other road feature from probe data using probe heading information. The systems and methods model the probe data as vectors in vector fields. The heading data provides a probe flow for a roundabout or road feature that can be used to detect the location and characteristics of the roundabout or other road feature. For example, modeling the probe data in close proximity to a roundabout creates circular probe flow pattern with a center that can be computed from the vector field. The center of the circular flow pattern for the probe data corresponds with the approximate center of the roundabout.

The disclosed embodiments take advantage of vector field fitting to identify circulation in vector fields. When circulation is present, the center is the singularity point which can be derived from the vector field. In one embodiment, a least squares vector field fitting method utilizes the heading information in the probe data to detect the approximate center of the roundabout and a least median of squares (LMS) method is used to estimate the true roundabout center location and the radius of the roundabout. Other vector fitting methods may be employed.

Using the probe heading data may result in robust detection of roundabout locations and characteristics using noisy probe location and heading data. Further, non-roundabout probe data can be included without affecting the detection of the roundabout center location or characteristics. For example, using a least squares vector field fitting method may be performed quickly and may not be computationally intensive. Further, further optimization is not necessary to detect the roundabout and can be computed from the vector field fitting without further computations. Additionally, a least median of squares method may estimate the true roundabout center location and the radius of the roundabout robustly using noisy probe location and heading data.

Figure 1:
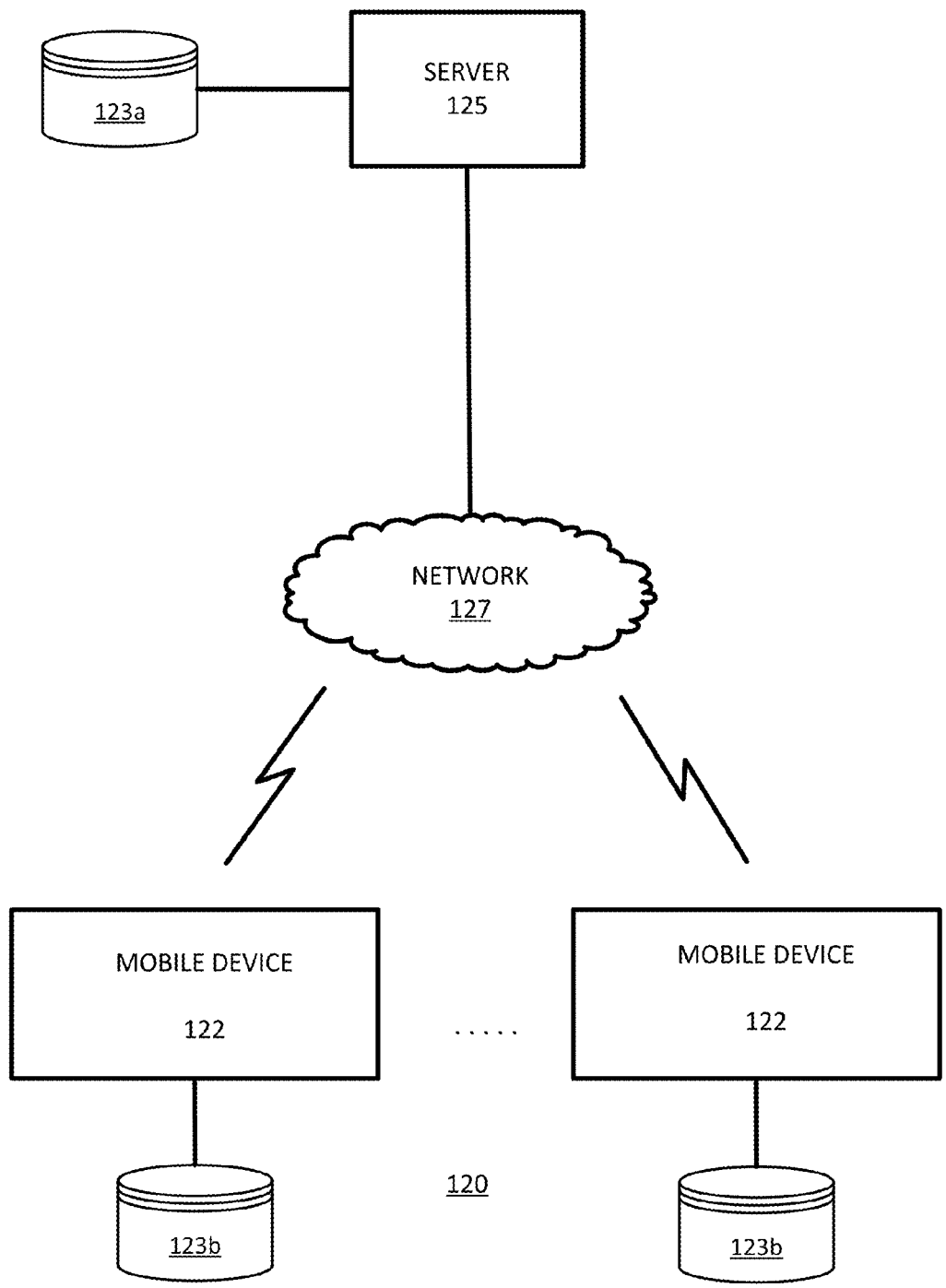
FIG. 1 illustrates an example map developer system according to an embodiment of the disclosed invention.

FIG. 1 illustrates an example map developer system 120 according to an embodiment of the disclosed invention. The map developer system 120 includes mobile devices 122 (e.g., navigation devices), a server 125 and a network 127. The databases 123a and 123b may be a geographic database including road links or segments. Additional, different, or fewer components may be provided. For example, many mobile devices 122 may connect with the network 127.

In one embodiment, probe data is collected by mobile devices 122 and transmitted to a server 125 over a network 127. The server 125 uses the probe data to detect the location and characteristics of a roundabout or other road feature. In another embodiment, the mobile devices 122 collect probe data and use the probe data to detect the location and characteristics of a roundabout or other road feature. The location and characteristics of a roundabout or other road feature are transmitted from the mobile devices 122 to the server 125 over the network 127. The detected locations and characteristics of a roundabout or other road feature are used to update the geographic databases 123a and 123b.

Figure 2:
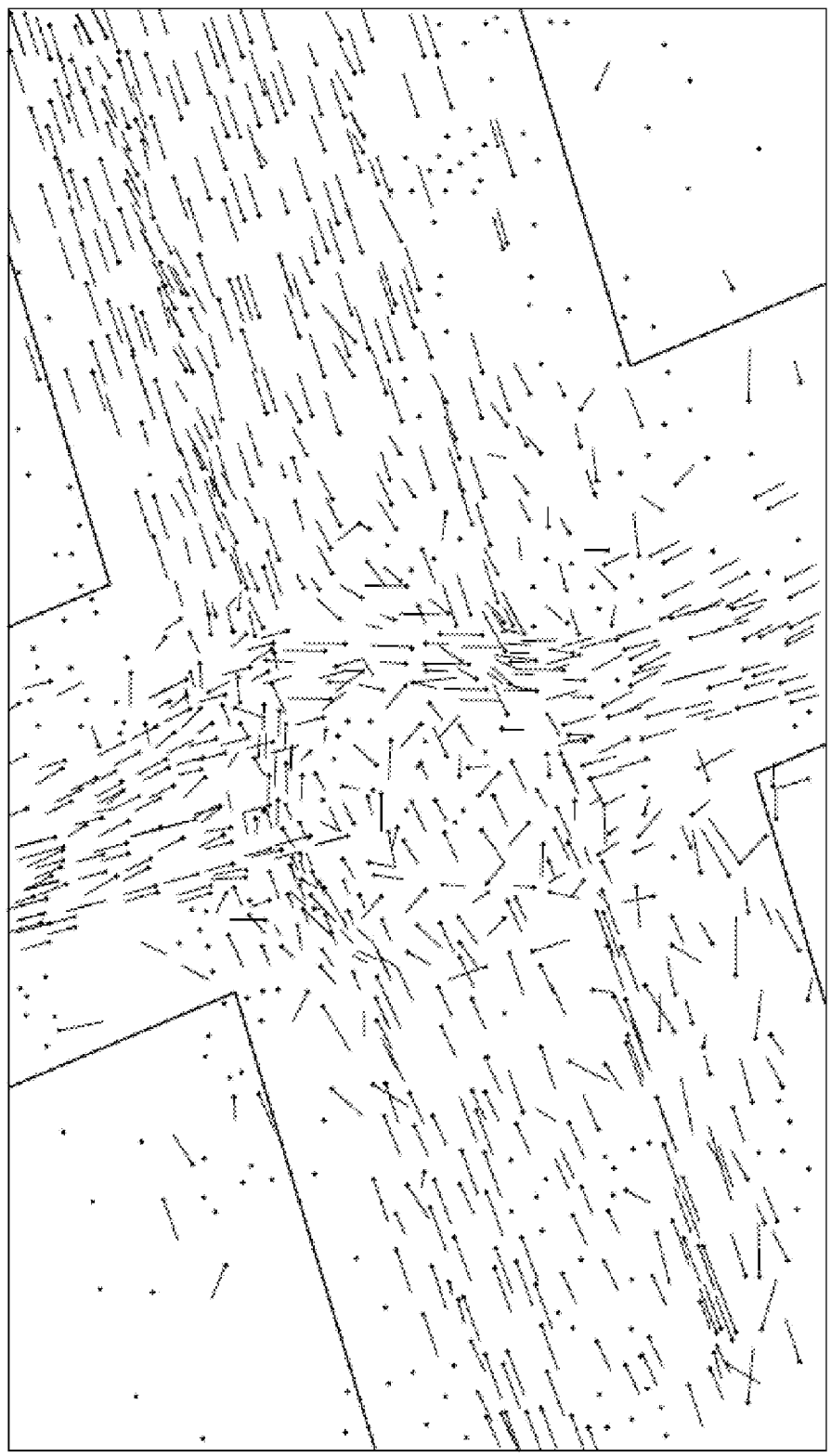
FIG. 2 illustrates an example of probe data used to detect a roundabout according to an embodiment of the disclosed invention.

FIG. 2 illustrates an example of probe data used to detect a roundabout according to an embodiment of the disclosed invention. The probe heading can be defined in several ways. The heading may be defined with vector components (e.g., v=(vx, vy), where vx is the x component of the heading vector v and vy is the y component of the heading vector v). The length of the heading vector is typically normalized to 1. Alternately, the heading can be defined using an angle with respect to a reference direction (e.g., north=0) and the direction is defined as positive angular direction (e.g., clockwise or counter clockwise). Further, Probe data with heading can be expressed using an offset location and a heading vector for each probe point, where the location is a two-dimensional coordinate and the vector components are supplied or derived from the heading angle. For example, the location of the probe is expressed in latitude and longitude coordinates, and the latitude and longitude coordinates can be transformed into two-dimensional coordinates (x,y). The heading vector components can be derived from the heading angle by defining a heading angle $\theta$ as zero degrees pointing north and deriving the heading vector components (vx, vy) from $vx=\sin(\theta)$, $vy=\cos(\theta)$. Referring to FIG. 2, each dot represents a probe location. Each line associated with the probe location represents the heading vector scaled by the probe speed. The probe speed is used to filter out slow probes that may be unreliable.

The probe data is used to identify possible locations for roundabouts or other road features. For example, possible locations for roundabouts and/or intersections can be identified as locations where probe vectors merge, intersect or bifurcate. Additionally, road curvatures may also be identified where probe vectors merge, intersect or bifurcate. For each possible roundabout or road feature location, probes are selected in a close proximity to the possible roundabout or road feature. The selection area around may include non-roundabout points as we are looking for the circulation center, not a perfect roundabout shape. In one embodiment, the selected probes may include probe data outside of the roundabout or road feature because the vector field fit method used, such as a least squares vector field fit, is able to detect a roundabout or other road feature notwithstanding the unrelated probe data.

The probe data is filtered to remove slow moving probes. Slow or stationary probes may be unreliable because the heading angle may not be accurate. For example, probe data from probes with a heading speed of less than a minimum speed (e.g., 5 kilometers per hour) are removed. Other heading speed thresholds may be used. The probe data filtering can be performed before, during, or after identifying possible locations for roundabouts or other road features, or before, during, or after selecting probes in a close proximity to the possible roundabout or road feature. Probes with noisy or erroneous heading, or with other data anomalies may also be removed. If the probe heading vectors have been scaled by speed, then the probe heading speeds (i.e., vector lengths) of the selected probe data may be normalized to a unit length (e.g., 1). Normalizing the heading vectors to 1 stabilizes the solution and removes the weight and influence of probe speed variability.

A vector field fit method is performed on the selected vector probe data to intrinsically capture circulation in vector fields. When circulation a vector field is present, the center is the singularity point which can be derived from the vector field. Circular singularities in the flow pattern can denote the center of the roundabout. For example, a least squares vector field fit may be used. Other vector field fit methods may be used.

Figure 3:
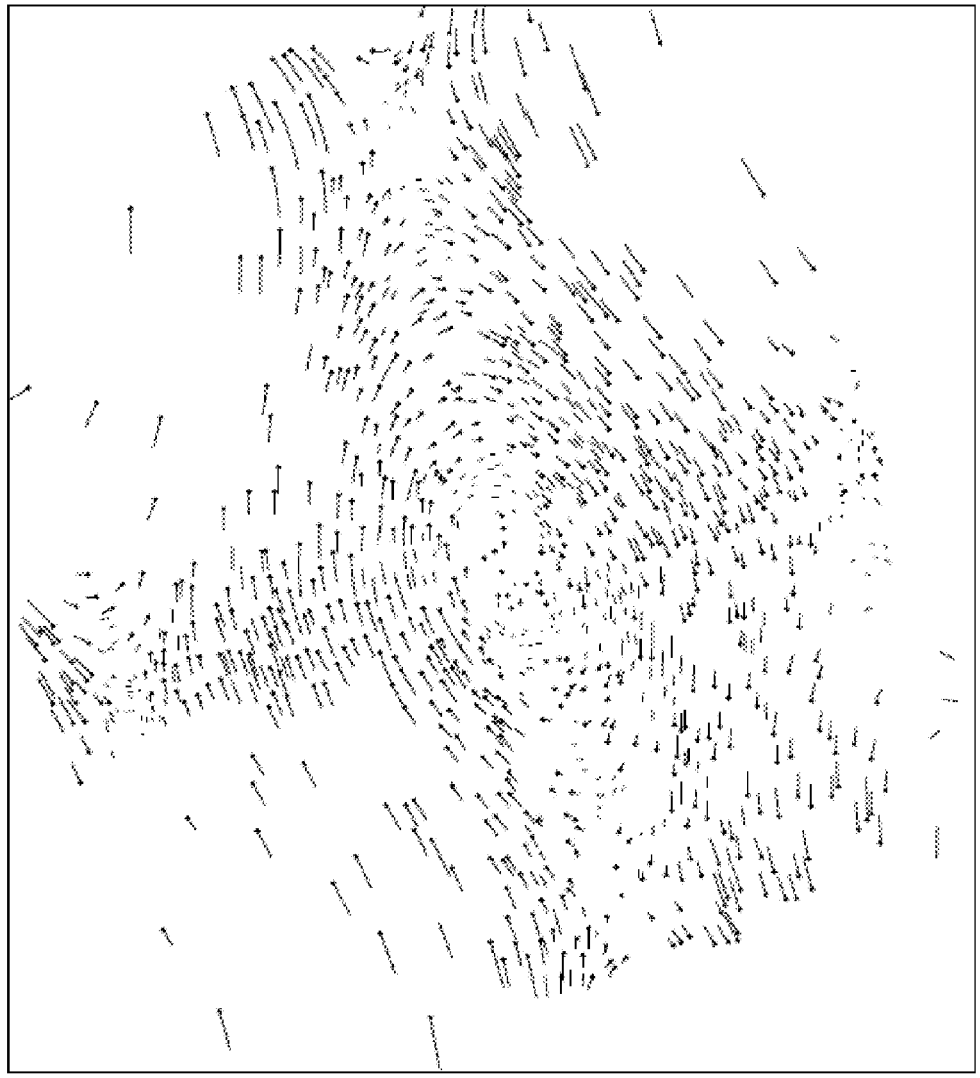
FIG. 3 illustrates the resulting vector field for a least squares vector field fit according to an embodiment of the disclosed invention.

FIG. 3 illustrates the resulting vector field for a least squares vector field fit according to an embodiment of the disclosed invention. The least squares vector field fit derives a vector field approximation to a set of probe vector points. The vector points each have an x and y location $P=\{p_1, p_2, \ldots, p_n\}$, where each point $p_i=(x_i, y_i)$, and heading vectors $V=\{v_1, v_2, \ldots, v_n\}$, where $v_i=(vx_i, vy_i)$. The least squares vector field fit may utilize a bivariate cubic polynomial to model the vector field approximation. Other models may be used.

A cubic bivariate polynomial is a third order polynomial function using two variables x and y to describe each vector component in x and y. For example, the x component of the vector, vx, can be evaluated at any point (x, y) using equation 1:

$$vx(x,y)=P(p)=P(x,y)=ax^3+bx^2+cx+dx^2y+exy^2+fy^3+gy^2+hy+i \quad \text{Eq. 1}$$

Similarly, the y component of the vector, vy, can be evaluated at any point (x, y) using equation 2:

$$vy(x,y)=Q(p)=Q(x,y)=jx^3+kx^2+lx+mx^2y+nxy^2+oy^3+py^2+qy+r \quad \text{Eq. 2}$$

Thus, the bivariate polynomial can be expressed using equation 3:

$$F(x,y)=(P_d(x,y),Q_d(x,y)) \quad \text{Eq. 3}$$

Using an index notation, the polynomial parameters {a, b, c, d, e, f, g, h, i} are expressed as a column vector using equation 4:

$$a=[a_{0,0}\ a_{1,0}\ \ldots\ a_{d,0}\ a_{0,1}\ \ldots\ a_{d-1,1}\ a_{0,2}\ \ldots\ a_{d-2,2}\ a_{0,d}]^t \quad \text{Eq. 4}$$

and the polynomial parameters {j, k, l, m, n, o, p, q, r} are expressed as column vector using equation 5:

$$b=[b_{0,0}\ b_{1,0}\ \ldots\ b_{d,0}\ b_{0,1}\ b_{d-1,1}\ b_{0,2}\ \ldots\ b_{d-2,2}\ b_{0,d}]^t \quad \text{Eq. 5}$$

Together, the bivariate polynomial can be expressed as summations using equations 6-7:

$$P_d(x,y) = \sum_{0 \le j+k}^{d} a_{j,k} x^j y^k \quad \text{Eq. 6}$$

$$Q_d(x,y) = \sum_{0 \le j+k}^{d} b_{j,k} x^j y^k \quad \text{Eq. 7}$$

where d is the polynomial degree (i.e., 3 for a cubic polynomial).

The parameters of the column vectors a and b are determined using least squares vector field fitting by minimizing the squared vector error using equation 8:

$$err(a,b) = \sum_{i=0}^{N} \|\mathcal{F}(p_i) - v_i\|^2 \quad \text{Eq. 8}$$

where the vector field approximation $F(p_i)=(P(p_i), Q(p_i))$ is used for each probe point $p_i$ and heading vector $v_i$.

For example, using a least squares vector fit method with the probe data of FIG. 2 results in the result of the vector fit approximation illustrated in FIG. 3. The vector fit approximation can be used to determine a circular singularity location and direction of flow (i.e., clockwise or counter clockwise) for the vector fit approximation. The circular singularity location corresponds with the approximate center of a roundabout and the direction of flow corresponds to traffic flow through the roundabout. For example, a streamline curvature vector based method may be used to determine the location of a circular singularity. Other techniques for determining a circular singularity can be used. The streamline curvature vector method is an iterative technique starting from a seed point and iteratively moving the seed point toward the center of curvature of a vortex center (if a center of curvature exists). The seed points are distributed throughout the vector field, for example, in a gridded manner. Some seed points diverge (i.e. move out of the bounds of the selection area) while other seed points converge to the same center of curvature of the vortex (if a center of curvature exists). In each iteration the seed points are moved a step length along the streamline normal vector. The step length (e.g., $s=\gamma r$) is derived from the streamline curvature ($\kappa$), so the seed points are moved a fraction (e.g., $\gamma=0.95$) of the radius of curvature ($r=1/K$) in each iteration. The iterations continue until the step length (s) is smaller than a threshold value (e.g., 0.1 meter), at which point the curvature center is extrapolated in an additional iteration (e.g., by setting $\gamma=1$). Once the center of curvature (i.e., circular singularity) has been identified, the circulation is validated by ensuring that the streamline curvature traces a full 360 degrees. The streamline curvature ($\kappa$) at a seed location s(x, y) is computed from the vector field F using equation 9:

$$\kappa(x,y) = \frac{P^2 \cdot \frac{\partial Q}{\partial x} - Q^2 \cdot \frac{\partial P}{\partial y} + P \cdot Q \cdot \left(\frac{\partial Q}{\partial y} - \frac{\partial P}{\partial x}\right)}{\|F\|^3} \quad \text{Eq. 9}$$

where the vector $F(x, y)=(P(x, y), Q(x, y))$, P is the x vector component of the streamline vector F and Q is the y vector component of the stream line vector F. The normal vector (n) is derived from the stream line vector F using equation 10:

$$n(x,y)=(-Q(x,y),P(x,y)) \quad \text{Eq. 10}$$

The sign of the curvature orientates the normal vector toward the center of curvature of the vortex center.

Figure 10:
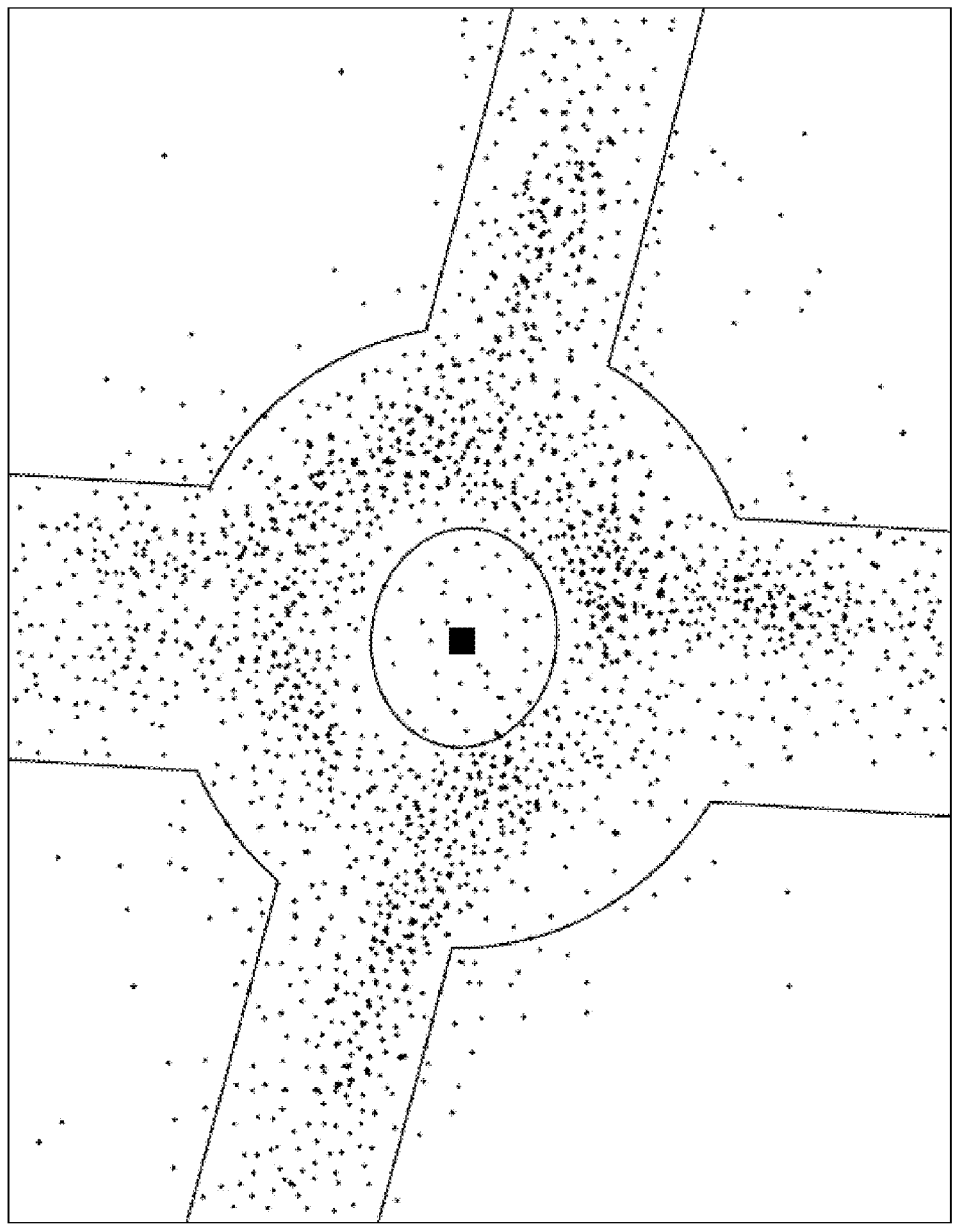
FIG. 10 illustrates a circular singularity that is approximately centered in the roundabout as determined by a vector fit approximation.
Figure 11:
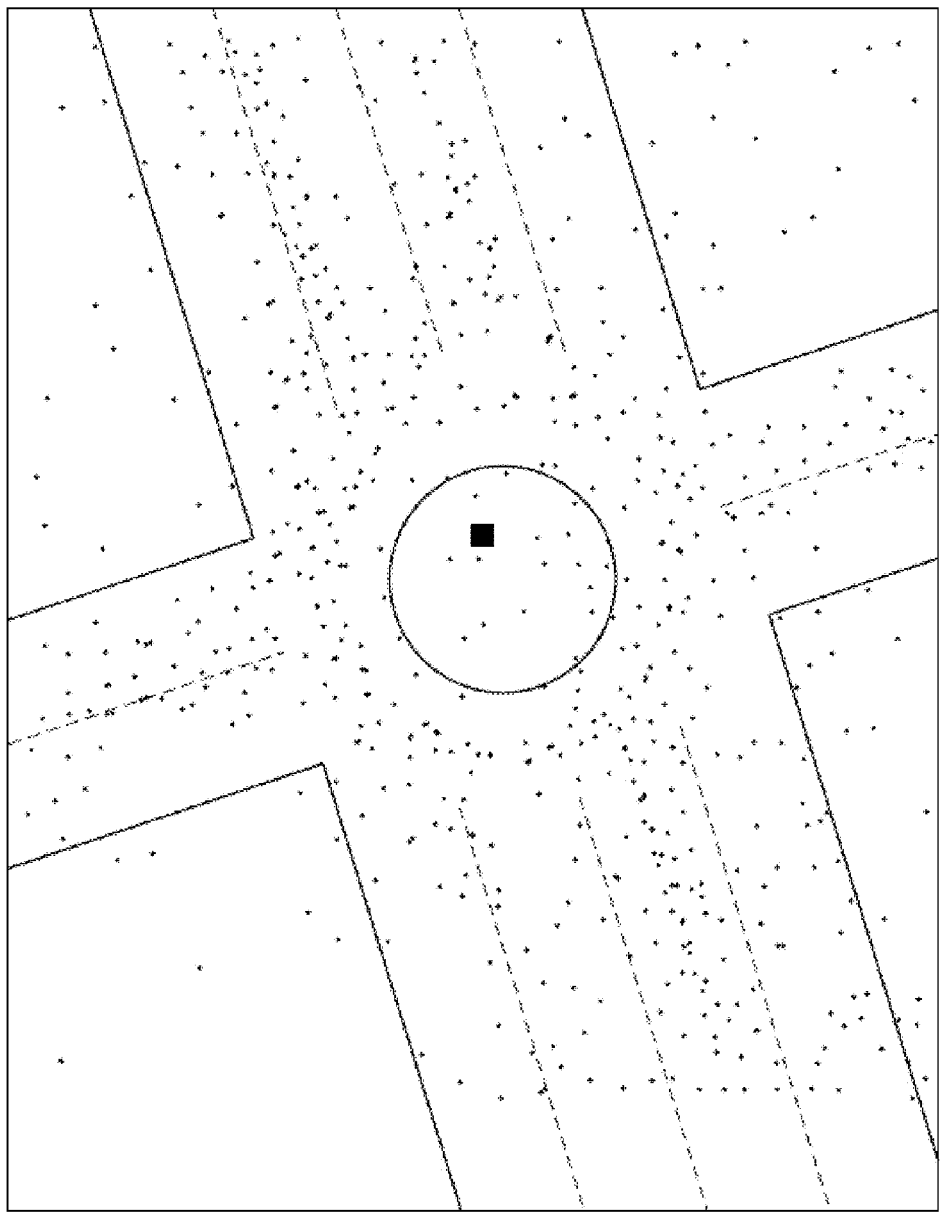
FIG. 11 illustrates a circular singularity that is not centered in the roundabout as determined by a vector fit approximation due to uneven probe distribution, uneven probe density and/or probe heading error.

After a circular singularity is determined, an optimal radius for the probe data points can be determined around the circular singularity. The roundabout center location is also optimized for the roundabout in the vicinity of the circular singularity. The roundabout center location is optimized because uneven probe distribution, uneven probe density and/or probe heading error may displace the circular singularity with respect to the true roundabout center. For example, FIG. 10 illustrates a circular singularity approximately centered in the roundabout. Conversely, FIG. 11 illustrates a circular singularity that is not centered in the roundabout due to uneven probe distribution, uneven probe density and/or probe heading error.

Figure 4:
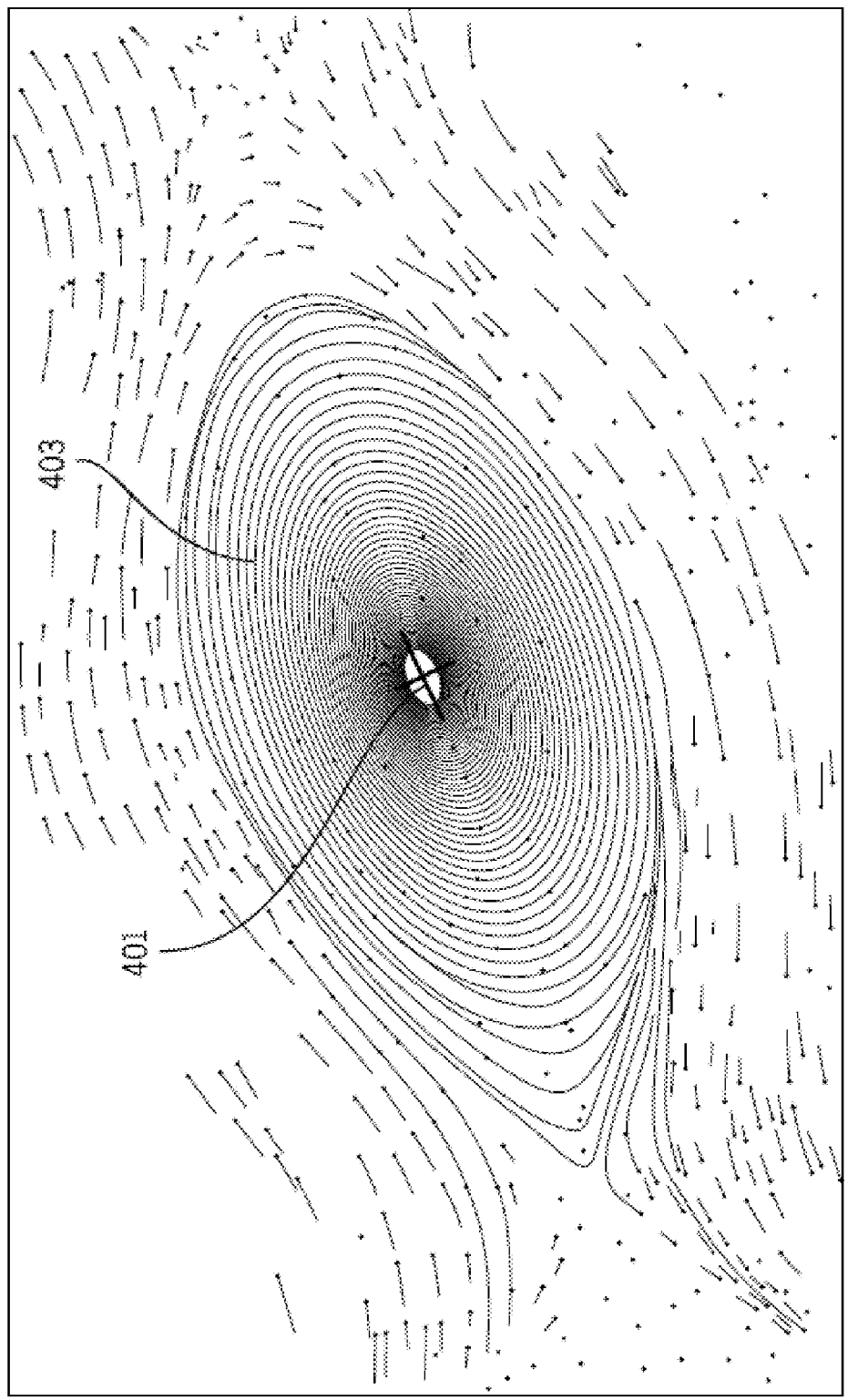
FIG. 4 illustrates vector field stream lines with a circular singularity according to an embodiment of the disclosed invention.

A least median of squares (LMS) method can be used to determine the optimal roundabout center location and the optimal radius for the vector fit approximation. Other optimization techniques can be used. FIG. 4 illustrates vector field stream lines with a circular singularity according to an embodiment of the disclosed invention. For example, a circular singularity 401 is identified for a roundabout. Vector field lines 403 are also identified for the roundabout. For each vector field circular singularity location detected, the optimal roundabout center location and the optimal radius of the roundabout are estimated. The least median of squares method varies the roundabout center location coordinates and the radius of a circle in the vicinity of the circular singularity and iteratively minimizes the median squared residual value for the circle. By varying the roundabout center location coordinates and the radius of the circle in the vicinity of the circular singularity, the optimal roundabout center location and optimal radius of the roundabout are determined when the median squared residuals are minimized.

Figure 5:
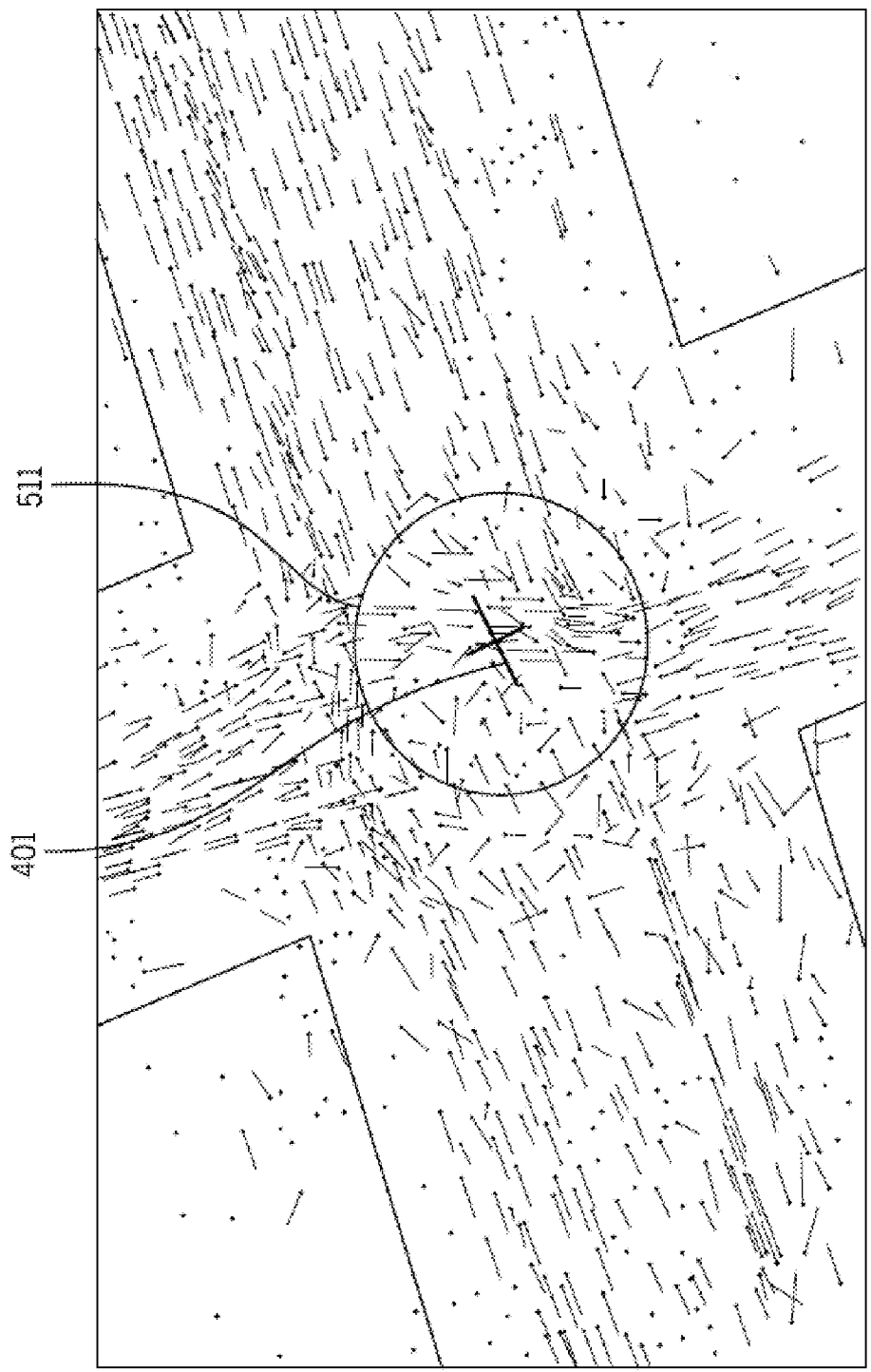
FIG. 5 illustrates a circle with a refined roundabout center and an estimated radius for the least median of squares technique according to an embodiment of the disclosed invention.

For example, FIG. 5 illustrates a circle with a refined roundabout center and an estimated radius used for the least median of squares technique according to an embodiment of the disclosed invention. For example, a circular singularity 401 is identified for a roundabout. In the least median of squares technique, three parameters are varied: the roundabout center 2D location (e.g., (latitude, longitude) or (x,y)) and the radius (R). A circle 511 with an estimated radius is provided around the estimated roundabout center in the vicinity of the circular singularity 401 and residuals are calculated for each probe point having a compatible vector heading (i.e., a point with a heading vector that is tangent to a circle (within some angular threshold value) around the circular singularity 401). The calculated residuals represent the perpendicular distance from each probe point to a point on the circle 511. A residual is calculated for each probe point and the median squared residual is determined for the estimated roundabout center location and radius. The roundabout center location and radius is varied iteratively and a median squared residual is determined for each estimated center location and radius. The residuals are squared and the smallest median squared residual value is selected. The estimated roundabout center location and radius for trial with the smallest median squared residual represents the optimal center location and radius of the circle 511.

For each trial k, parameters $\hat{\theta}_k = \{x_k, y_k, R_k\}$ are selected defining a circle $c_k$ centered near the circular singularity with center coordinates $(x_k, y_k)$ and radius $R_k$, and the least median of squares technique can be represented by the statistical formula in equation 11:

$$\underset{\hat{\theta}}{\text{minimize}}\, \underset{i}{\text{med}}\, r_i^2 \qquad \text{Eq. 11}$$

where $r_i$ is the computed residual values for the probe data point i with a compatible heading (i.e., a point with a heading vector that is tangent (within some angular threshold value) to a circle for the estimated roundabout center).

Further, a scale estimate $s^0$ and standard deviation estimate $\sigma^*$ can be computed for the circle $c_k$. The scale estimate can be represented by the formula in equation 12:

$$s^0 = 1.4826 * (1 + 5/(n-p)) * \sqrt{\min(\text{med}(r_i^2))} \qquad \text{Eq. 12}$$

where p is the number of parameters (i.e., 3 parameters for the varied radius, roundabout center x, and roundabout center y), n is the number of probe points, (1+5/(n−2)) is a finite sample correction factor and 1.4826 represents the asymptotic correction for normal errors, calculated by 1/Φ−1(0.75)=1.4826. Φ(x) denotes the standard normal cumulative distribution function which describes the probability that a real-valued random variable x with a given probability distribution (i.e. the Normal probability distribution in our case) will be found to have a value less than or equal to x. Thus $\Phi^{-1}(x)$ is the inverse standard normal cumulative distribution function, and 1/Φ−1 (0.75) is 1 over the inverse standard normal cumulative distribution function.

The standard deviation estimate can be represented by the following formulas in equations 13 and 14:

$$\sigma^* = \sqrt{\frac{\sum_{i=0}^n w_i r_i^2}{\sum_{i=0}^n w_i - p}} \qquad \text{Eq. 13}$$

$$\text{where } w_i = \begin{cases} 1 & \text{if } |r_i/s^0| \le 2.5 \\ 0 & \text{otherwise} \end{cases} \qquad \text{Eq. 14}$$

The standard deviation estimate $\sigma^*$ can be used to estimate the roundness of a roundabout. For example, a low variance is associated with a substantially circular roundabout shape. Conversely, a high variance is associate with a substantially oval shape. If a high variance is identified, an ellipse fitting technique can be used to determine the shape of the roundabout. Further, the number of lanes for the roundabout may be estimated from the variance as the variance increases with increasing the number of lanes for the roundabout.

Figure 6:
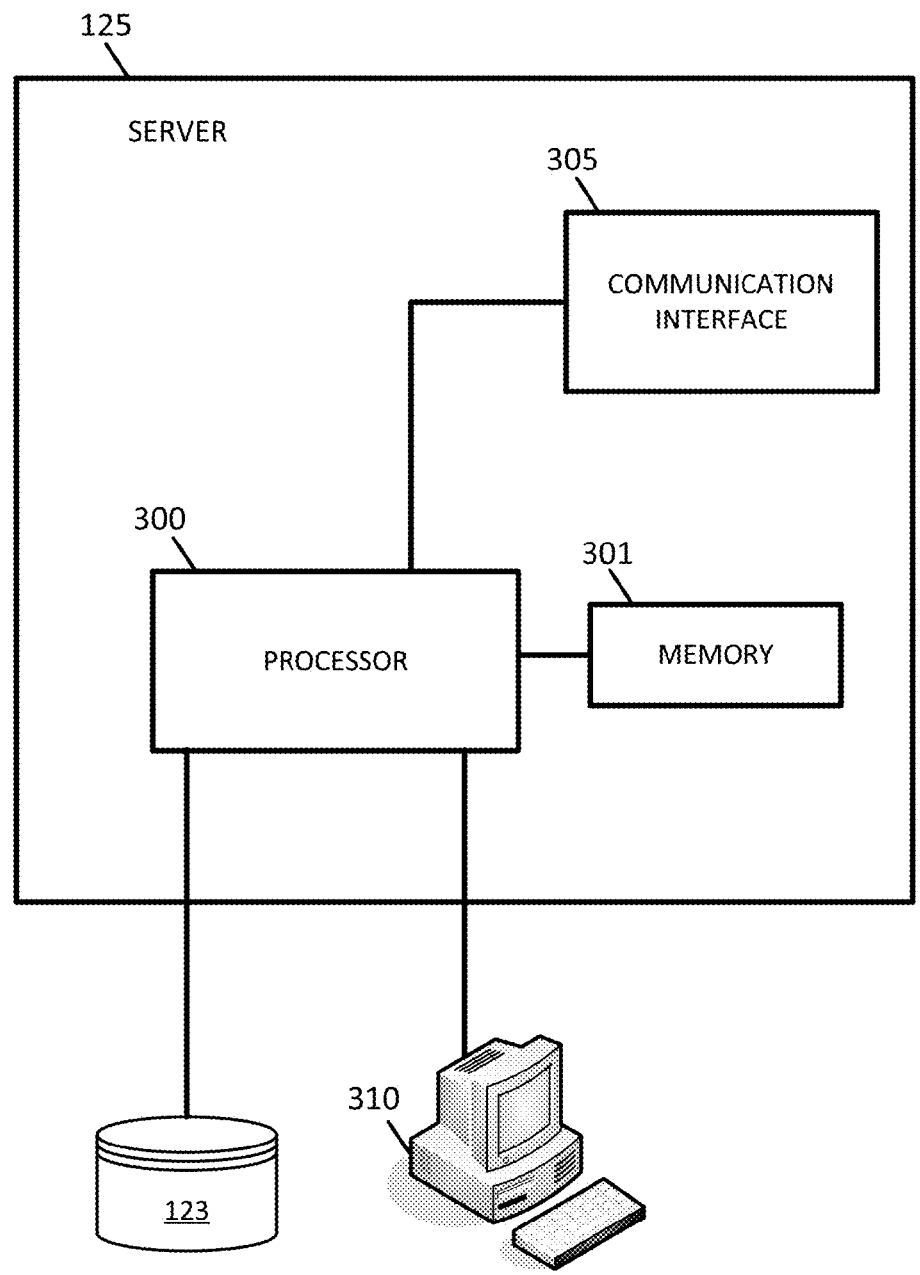
FIG. 6 illustrates an example server device according to an embodiment of the disclosed invention.

FIG. 6 illustrates an example server device according to an embodiment of the disclosed invention. The server 125 includes a processor 300, a communication interface 305, and a memory 301. Additional, different, or fewer components may be provided. The processor 300 may be any processor suitable for the execution of a computer program include, by way of example, both general and special purpose microprocessors, and anyone or more processors of any kind of digital computer. Generally, a processor receives instructions and data from a read only memory, a random access memory or both. The server 125 may be coupled to a database 123 and a workstation 310. Additional, different, or fewer components may be provided. The workstation 310 may be used by a user to access the server 125. The database 123 may store the probe data collected by mobile devices 122.

Figure 7:
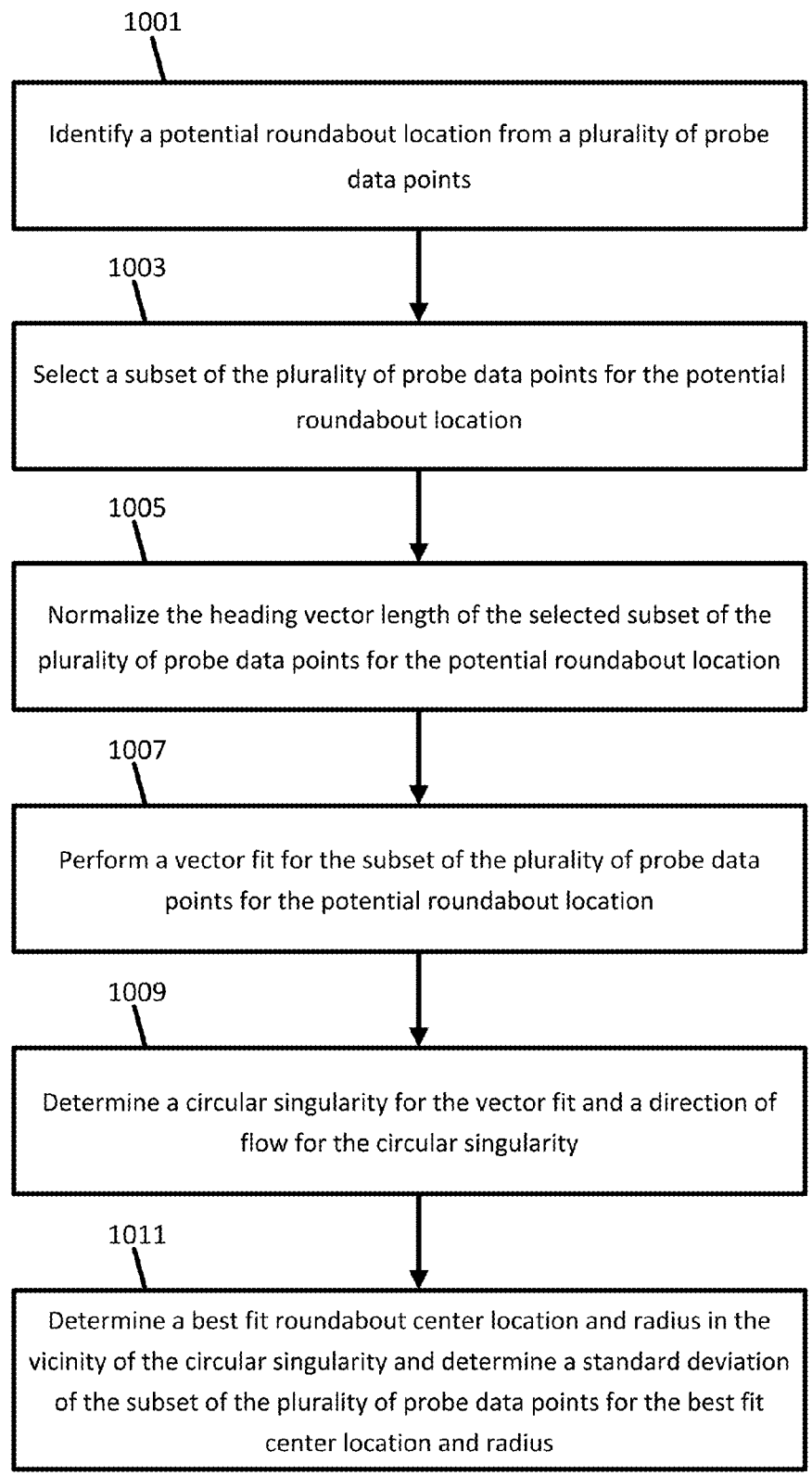
FIG. 7 illustrates an example flowchart for the server device of FIG. 6 according to an embodiment of the disclosed invention.

FIG. 7 illustrates an example flowchart for the server device of FIG. 6 according to an embodiment of the disclosed invention. Additional, different or fewer acts may be provided. The method is provided in the order shown. Other orders may be provided and steps may be repeated.

At act 1001, the server 125 identifies a potential roundabout location from probe data points received from mobile devices 122. Alternatively, probe data may be received from another location. For example, the probe data points may be received from a third party provider of probe data. Probe data may represent 6 months of data collection. Alternatively, the probe data may represent may represent a different timeframe, such as 1 month, 1 week or 1 day, depending on the provider of the probe data and the location of data collection. Possible locations for roundabouts and/or intersections can be identified from the probe data as locations where probe vectors merge, intersect or bifurcate.

At act 1003, the server 125 selects a subset of the probe data points for the potential roundabout location. For example, probes are selected in an area surrounding the potential roundabout or road feature. Further, the probe data may be filtered to remove slow moving and/or stationary probes. Other rationales may be used for selecting a subset of probe data, such as removing probe data with noisy or erroneous headings, or other data anomalies.

At act 1005, the server 125 normalizes the heading vector length of the selected subset of the probe data points for the potential roundabout locations. For example, the probe heading speeds (i.e. vector lengths) of the selected probe data may be normalized to a unit length (e.g., 1). Normalizing the heading speeds to 1 stabilizes the solution and removes the weight and influence of probe speed variability.

At act 1007, the server 125 performs a vector fit for the subset of probe data points for the potential roundabout location. A vector field fit method is performed on the selected vector probe data to intrinsically capture circulation in vector fields. When circulation a vector field is present, the center is a circular singularity point that can be derived from the vector field. Circular singularities in the flow pattern can denote the center of the roundabout. For example, a least squares vector field fit may be used. Other vector field fit methods may be used.

At act 1009, the server 125 determines a circular singularity for the vector fit and a direction of flow for the circular singularity. The vector fit approximation can be used to determine a circular singularity location and direction of flow (i.e., clockwise or counter clockwise) for the vector fit approximation. The circular singularity location corresponds with the center of a roundabout and the direction of flow corresponds to traffic flow through the roundabout.

At act 1011, the server 125 determines a best fit roundabout center location and radius in the vicinity of the circular singularity and determines a standard deviation for the subset of the probe data points for the best fit center location and radius. For example, after a roundabout center has been identified, the best fit center location and radius of the roundabout can be determined using a least median of squares (LMS) method. Other methods of determining the best fit radius may be used.

Figure 8:
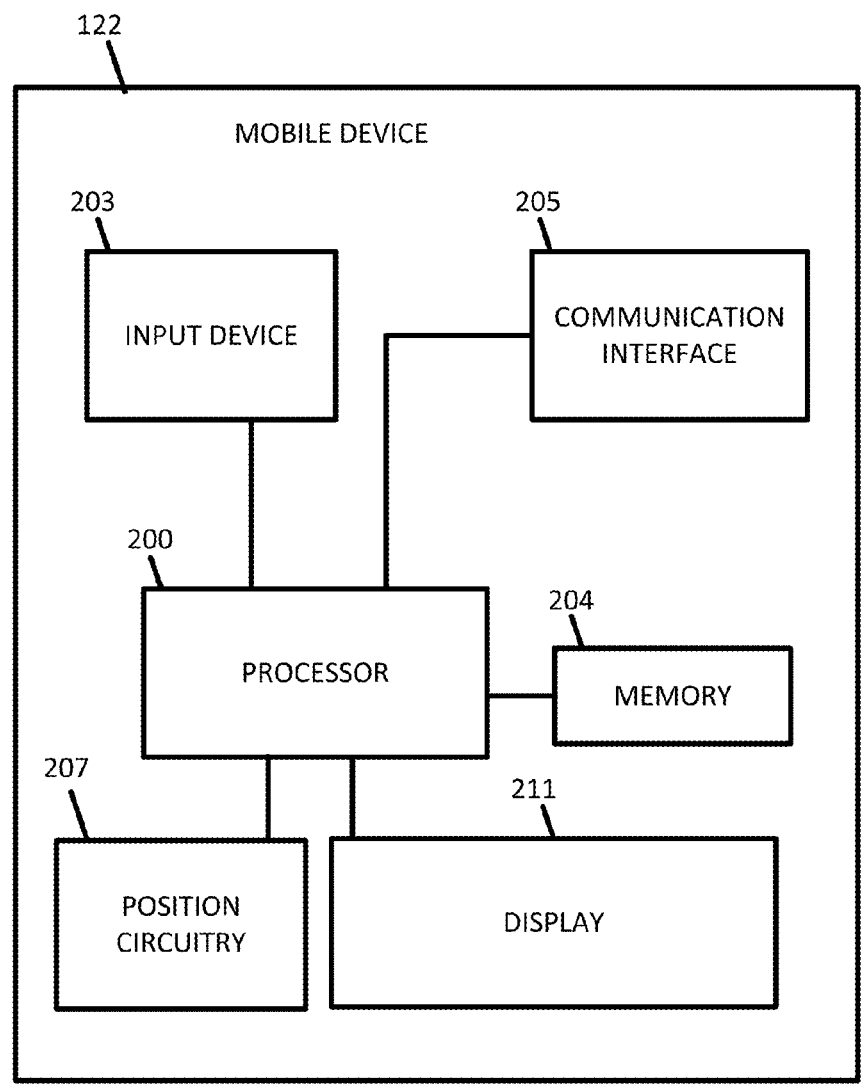
FIG. 8 illustrates an example mobile device according to an embodiment of the disclosed invention.

FIG. 8 illustrates an example mobile device according to an embodiment of the disclosed invention. The mobile device 122 includes a processor 200, a memory 204, an input device 203, a communication interface 205, position circuitry 207, and a display 211. Additional, different, or fewer components are possible for the mobile device 122.

The processor 200 may be any processor suitable for the execution of a computer program include, by way of example, both general and special purpose microprocessors, and anyone or more processors of any kind of digital computer. Generally, a processor receives instructions and data from a read only memory, a random access memory or both.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

The input device 203 may be one or more buttons, keypad, keyboard, mouse, stylist pen, trackball, rocker switch, touch pad, voice recognition circuit, or other device or component for inputting data to the mobile device 100. The input device 203 and the display 211 may be combined as a touch screen, which may be capacitive or resistive. The display 211 may be a liquid crystal display (LCD) panel, light emitting diode (LED) screen, thin film transistor screen, or another type of display.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

Figure 9:
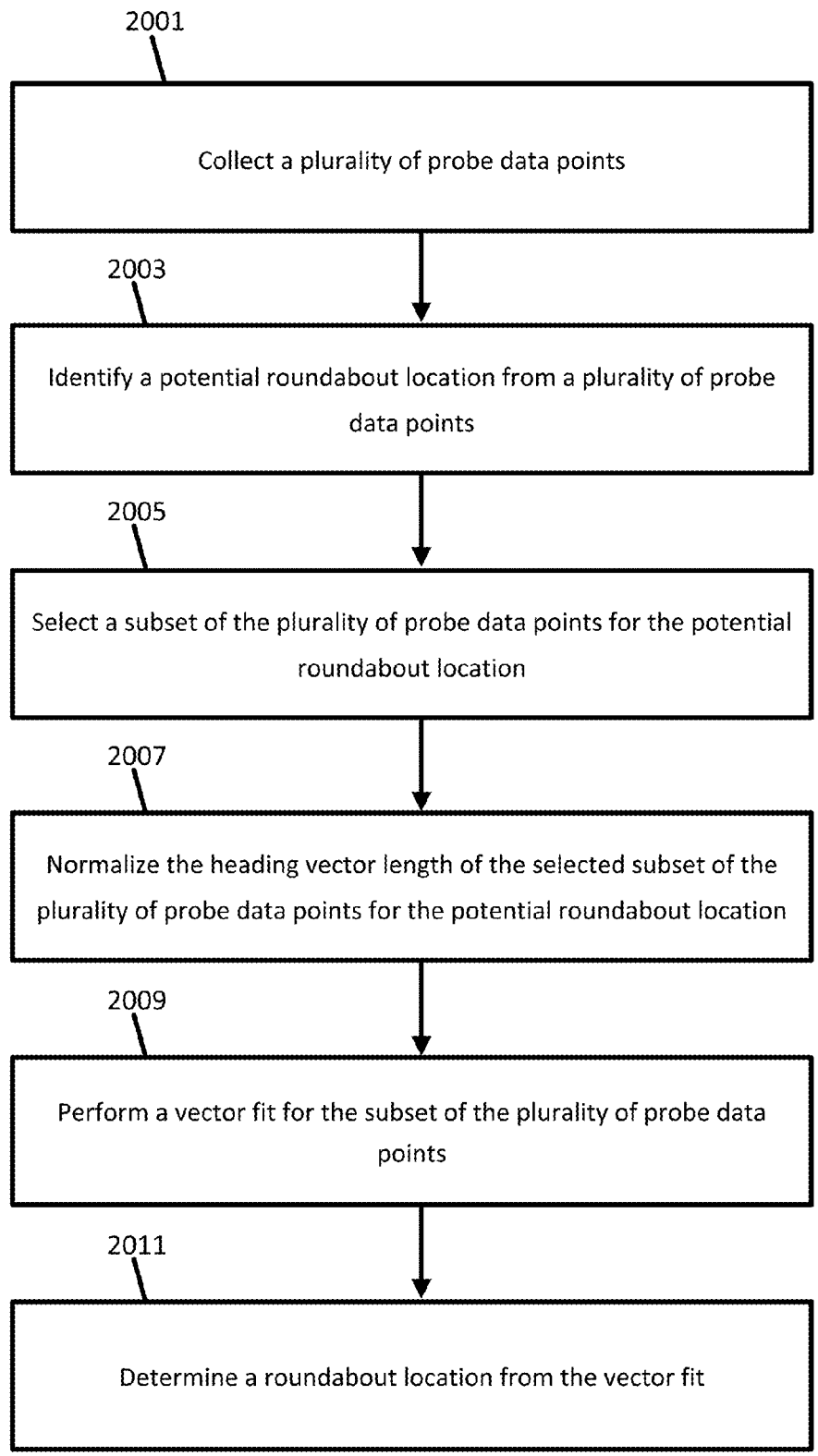
FIG. 9 illustrates an example flowchart for the mobile device of FIG. 8 according to an embodiment of the disclosed invention.

FIG. 9 illustrates an example flowchart for the mobile device of FIG. 8 according to an embodiment of the disclosed invention. Additional, different or fewer acts may be provided. The method is provided in the order shown. Other orders may be provided and steps may be repeated.

At act 2001, the mobile device 122 collects probe data points. At act 2003, the mobile device 122 identifies a potential roundabout location from the collected probe data points. For example, possible locations for roundabouts and/or intersections can be identified as locations where probe vectors merge, intersect or bifurcate.

At act 2005, the mobile device 122 selects a subset of the probe data points for the potential roundabout location. For example, probes are selected in an area surrounding the potential roundabout or road feature. Further, the probe data may be filtered to remove slow moving and/or stationary probes.

At act 2007, the mobile device 122 normalizes the heading vector length of the selected subset of the probe data points for the potential roundabout locations. For example, the probe heading speeds (i.e. vector lengths) of the selected probe data may be normalized to a unit length (e.g., 1). Normalizing the heading speeds to 1 stabilizes the solution and removes the weight and influence of probe speed variability.

At act 2009, the mobile device 122 performs a vector fit for the subset of probe data points for the potential roundabout location. A vector field fit method is performed on the selected vector probe data to intrinsically capture circulation in vector fields. When circulation a vector field is present, the center is a circular singularity point that can be derived from the vector field. Circular singularities in the flow pattern can denote the approximate center of the roundabout. For example, a least squares vector field fit may be used. Other vector field fit methods may be used.

At act 2011, the mobile device 122 determines a roundabout location from the vector fit. The vector fit approximation can be used to determine a circular singularity location and direction of flow (i.e, clockwise or counter clockwise) for the vector fit approximation. The circular singularity location corresponds with the approximate center of a roundabout and the direction of flow corresponds to traffic flow through the roundabout. The optimal center of the roundabout may be determined using a technique such as least median of squares (LMS).

Referring to FIG. 1, map databases, such as geographic databases 123*a* and 123*b*, are used in computer-based systems that provide useful features to users. For example, map databases are used for the identification of routes to destinations or points of interests. A navigation system determines the optimum route to be taken by the end user to travel from the origin to the destination location from map data stored in a geographic (or map) database. Map databases are also used in advanced driver assistance systems, such as curve warning systems, adaptive cruise control systems and headlight aiming systems. Map databases are also used in systems that improve vehicle fuel economy, such as systems that optimize transmission gear selection taking into account upcoming slope and speed changes.

As shown in FIG. 1, a master copy of the geographic database 123a may be stored at the server 125, and a local copy of the geographic database 123b may be stored at the mobile device 122. In one example, the local copy of the database 123b is a full copy of the geographic database, and in another example, the local copy of the database 123b may be a cached or partial portion of the geographic database. The cached portion may be defined based on a geographic location of the mobile device 122 or a user selection made at the mobile device 122. The geographic databases 123a and 123b may be a geographic database including road links or segments. Additional, different, or fewer components may be provided.

The geographic databases 123a and 123b may store or maintain geographic data such as, for example, road segment or link data records and node data records. The link data records are links or segments representing the roads, streets, or paths. The node data records are end points (e.g., intersections) corresponding to the respective links or segments of the road segment data records. The road link data records and the node data records may represent, for example, road networks used by vehicles, cars, and/or other entities.

Each road segment may be associated with two nodes (e.g., one node represents the point at one end of the road segment and the other node represents the point at the other end of the road segment). The node at either end of a road segment may correspond to a location at which the road meets another road, i.e., an intersection, or where the road dead-ends. Each road segment may be associated with zero or more shape points. Shape points are an ordered sequence of vertices that indicate the shape of the road as a polyline between the nodes. The road shape may also be represented by an analytical curve such as a B-spline, Bezier curve, Clothoid curve or other curve types. The road segments may include sidewalks and crosswalks for travel by pedestrians.

Each of the road segments or links may be associated with various attributes or features stored in lists that are not byte aligned. The road segment data record may include data that indicate a speed limit or speed category (i.e., the maximum permitted vehicular speed of travel) on the represented road segment. The road segment data record may also include data that indicate a classification such as a rank of a road segment that may correspond to its functional class. The road segment data may include a segment ID by which the data record can be identified in the geographic database 123. The road segment data, nodes, segment IDs, attributes, fields, and other data may be organized in data structures described above.

The road segment data may include data identifying what turn restrictions exist at each of the nodes which correspond to intersections at the ends of the road portion represented by the road segment, the name or names by which the represented road segment is known, the length of the road segment, the grade of the road segment, the street address ranges along the represented road segment, the permitted direction of vehicular travel on the represented road segment, whether the represented road segment is part of a controlled access road (such as an expressway), a ramp to a controlled access road, a bridge, a tunnel, a toll road, a ferry, and so on. The additional road segment data may be organized in data tree structures. Alternatively, the data tree structures may be included in a separate database, for example, internal to the server 125 and/or the mobile device 122, or at an external location.

The server 125 may send map updates to the mobile device 122. The server 125 may update a particular tile of the geographic database 123. The server 125 may send updates to the master copy of the geographic database 123a and/or send updates to the local copy of the geographic database 123b. The server 125 may generate an update script or patch file for the navigation data and transmit the update script or patch file to the mobile device 122 to update the local copy of the database 123b.

The mobile device 122 may be a personal navigation device ("PND"), a portable navigation device smart phone, a mobile phone, a personal digital assistant ("PDA"), a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The mobile device 122 may be configured to execute routing algorithms to determine an optimum route to travel along a road network from an origin location to a destination location in a geographic region. Using input from the end user, the mobile device 122 examines potential routes between the origin location and the destination location to determine the optimum route. The mobile device 122 may then provide the end user with information about the optimum route in the form of guidance that identifies the maneuvers required to be taken by the end user to travel from the origin to the destination location. Some mobile devices show detailed maps on displays outlining the route, the types of maneuvers to be taken at various locations along the route, locations of certain types of features, and so on.

The computing resources may be divided between the server 125 and the mobile device 122. In some embodiments, the server 125 performs a majority of the processing. In other embodiments, the mobile device 122 performs a majority of the processing. In addition, the processing may be divided substantially evenly between the server 125 and the mobile device 122.

The developer system 121, the mobile device 122 is coupled with the network 127. The phrase "coupled with" is defined to mean directly connected to or indirectly connected through one or more intermediate components. Such intermediate components may include hardware and/or software-based components. Many mobile devices 122 may connect with the network 127.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or is operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, or projector, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
    identifying, using a processor, a potential roundabout location from a plurality of probe data points received from a plurality of mobile devices, wherein each of the plurality of probe data points is represented by a location, a heading vector and a velocity;
    selecting, using the processor, a subset of the plurality of probe data points for the potential roundabout location;
    normalizing, using the processor, a vector length of the selected subset of the plurality of probe data points;
    performing, using the processor, a vector fit for the subset of the plurality of probe data points;
    detecting a roundabout location from the vector fit, and
    updating a geographic database based on the roundabout location.

2. The method of claim 1, wherein identifying a potential roundabout location comprises identifying locations where probe data points merge or intersect.

3. The method of claim 1, wherein identifying a potential roundabout location comprises identifying locations where probe data points bifurcate.

4. The method of claim 1, wherein a location of each of the plurality of probe data points represents a longitude and a latitude.

5. The method of claim 1, wherein the heading vector of each of the plurality of probe data points represents a heading direction of the probe.

6. The method of claim 5, wherein the subset of the plurality of probe data points excludes at least one probe data point with a velocity less than a threshold.

7. The method of claim 1, wherein the vector fit includes a least squares vector field fit to the subset of the plurality of probe data points.

8. The method of claim 7, wherein the vector field fit comprises a bivariate cubic polynomial.

9. The method of claim 1, further comprising:
determining, using the processor, a circular singularity for the vector fit; and
determining, using the processor, a direction of flow for the circular singularity, wherein the roundabout location is determined from the direction of flow and the circular singularity.

10. The method of claim 9 further comprising:
determining, using the processor, a roundabout center location and a radius for a vicinity of the circular singularity.

11. The method of claim 10, wherein the roundabout center location and the radius is determined from iteratively varying an estimated roundabout center location and an estimated radius in the vicinity of the circular singularity.

12. The method of claim 11, wherein determining the roundabout center location and the radius comprises performing a least median of squares technique, the least median of squares technique comprising:
computing median squared residual values for the plurality of probe data points with respect to an estimated circle formed using the estimated roundabout center location and the estimated radius; and
selecting the roundabout center location and the radius for which the median squared residual values is minimized.

13. The method of claim 10 further comprising:
determining, using the processor, a standard deviation of the subset of the plurality of probe data points to the roundabout center location and the radius.

14. An apparatus comprising:
at least one processor; and
at least one memory including computer program code for one or more programs;
the at least one memory and the computer program code configured to, with the at least one processor, cause the apparatus to at least perform:
identifying a potential roundabout location from a plurality of probe data points, wherein each of the plurality of probe data points is represented by a location, a heading vector and a velocity;
selecting a subset of the plurality of probe data points for the potential roundabout location;
normalizing a vector length of the selected subset of the plurality of probe data points;
performing a vector fit for the subset of the plurality of probe data points;
determining a circular singularity for the vector fit;
determining a direction of flow for the circular singularity;
determining a roundabout center location and a radius for the in a vicinity of the circular singularity,
updating a geographic database based on the roundabout center location and the radius, and
providing a navigation system update for a mobile device based on the updated geographic database.

15. The apparatus of claim 14, wherein identifying a potential roundabout location comprise identifying locations where probe data points merge, intersect or bifurcate.

16. The apparatus of claim 14, wherein selecting a subset of the plurality of probe data points excludes probe data points with substantially zero velocity.

17. The apparatus of claim 14, wherein performing the vector fit comprises preforming a least squares vector field fit to the subset of the plurality of probe data points.

18. The apparatus of claim 14, wherein determining the roundabout center location and the radius comprises performing a least median of squares technique, the least median of squares technique comprising:
iteratively varying a roundabout center location and a roundabout radius in the vicinity of the circular singularity;
computing the median squared residual value for the plurality of probe data points with respect to varied roundabout center location and the varied radius; and
selecting the roundabout center location and the radius for which the median squared residual is least.

19. The apparatus of claim 14, wherein the at least one memory and the computer program code configured to, with the at least one processor, cause the apparatus to at least perform:
determining a standard deviation of the subset of the plurality of probe data points to the roundabout center location and the radius.

20. A non-transitory computer readable medium including instructions that when executed are operable to:
select a potential roundabout location from a plurality of probe data points, wherein each of the plurality of probe data points is represented by a location, a heading vector and a velocity;
select a subset of the plurality of probe data points for the potential roundabout location;
perform a vector fit for the subset of the plurality of probe data points;
determine a circular singularity for the vector fit;
determine a direction of flow for the circular singularity;
determine a roundabout center location and a radius for the circular singularity;
update a geographic database based on the roundabout center location and the radius; and
providing a route to a user based on the updated geographic database.

21. The non-transitory computer readable medium of claim 20, wherein performing the vector fit comprises preforming a least squares vector field fit to the subset of the plurality of probe data points.

22. The non-transitory computer readable medium of claim 20 including instructions that when executed are operable to:
determine a standard deviation of the subset of the plurality of probe data points to the radius.

* * * * *